Patented Mar. 27, 1923.

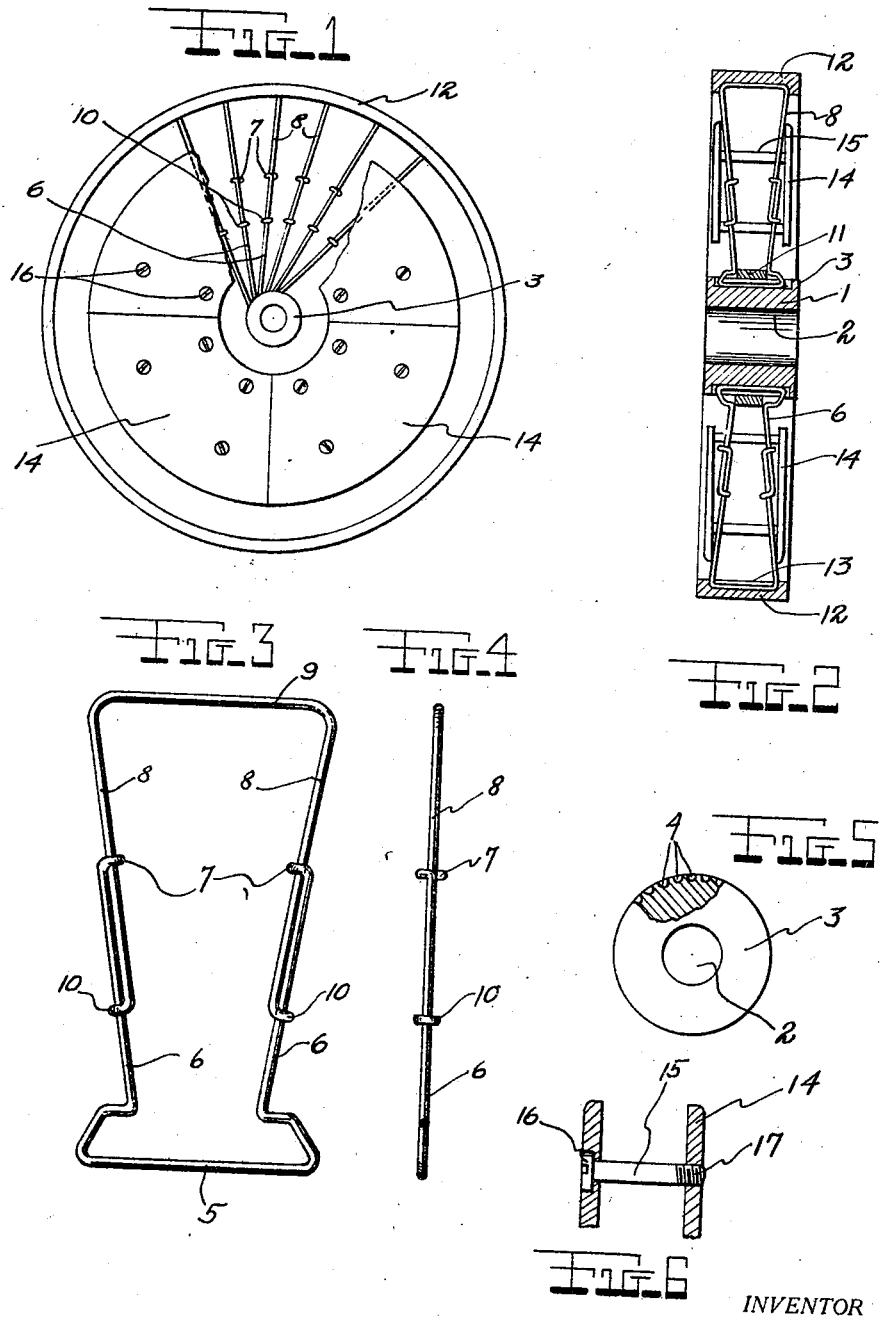

1,449,743

UNITED STATES PATENT OFFICE.

JOSEPH BERGER, OF NEW YORK, N. Y.

RESILIENT VEHICLE WHEEL.

Application filed December 19, 1922. Serial No. 607,775.

*To all whom it may concern:*

Be it known that I, JOSEPH BERGER, citizen of the United States, and resident of New York, in the county of New York and State of New York, have invented certain new and useful Improvements in Resilient Vehicle Wheels, of which the following is a specification.

This invention relates to vehicle wheels, and the main object is to provide a wheel equipped with wire spokes, the latter being capable of longitudinal extension and extending radially from hub of the wheel.

Another object is to provide an improved type of resilient wheel which may be adapted to any vehicle, and which is designed so that a section of the wire spokes may be removed without dismantling the entire wheel.

Still another object is to provide disks which guard the spokes from being bent or otherwise injured.

These and other objects will become apparent in the description below, in which characters of reference refer to like-named parts in the drawing.

Referring briefly to the drawing, Figure 1 is a side elevational view of the improved type of resilient wheel.

Figure 2 is an enlarged sectional view of the wheel taken approximately centrally thru the wheel.

Figure 3 is a front elevational view of one of the spokes.

Figure 4 is a side elevational view of the same.

Figure 5 is an elevational view of the hub, part of the flange being broken away to show the spoke cradles.

Figure 6 is a sectional elevational view showing the means for securing the disks in place.

Describing the drawing in detail, the numeral 1 indicates the hub of the wheel which has a hole 2 therein the latter being adapted to be fitted on a vehicle. Annular side flanges 3 are formed on the hub between adjacent members of which a plurality of longitudinal grooves 4 are formed, said grooves providing cradles for the spokes. The spokes of the wheel are separate members and are composed of two stout wires. The lower member has a connecting brace 5 from the ends of which a pair of arms 6 extend upwardly and divergently. The upper ends of said arms have loops 7 formed thereon, said loops being bent angularly and inwardly. These loops slidably receive the arms 8 of the upper spoke member which are also connected by a brace 9. The arms 8 of the upper wire member converge and have loops 10 at their lower ends which receive the arms 6 of the lower member. The brace 5 which connects the lower arms 6 are cradled in the grooves 4 of the hub 1, and are retained in place by an annular strap 11 which encircles the hub. Said strap is preferably made of a number of sections, the purpose of this construction being to expose only part of spokes in the event of repair.

The outer rim 12 of the wheel is also provided with a plurality of grooves similar to those on the hub and are adapted to cradle the braces 9 of the arms 8. The opposite spokes extend radially outward and at a tangent from the hub. The tire shown on the drawing has a flat peripheral face but any type of tire may be used for the purpose.

An annular disk composed of a number of sections 14 is secured to the side of the spokes. Said disk is preferably composed of a number of quadrants which may be detached without disturbing the adjacent sections. The disks are aligned in pairs on each side of the spokes and serve as means for protecting the spokes from injury. The disk sections are rigidly secured in place on the wheels by bolts 15 which have flanged heads 16 at one end, said head being adapted to shoulder in recesses in the disk sections on one side of the wheel. The bolts pass between the spokes and the threaded ends 17 engage the disk sections on the opposite side of the wheel.

The wheel may be readily assembled and dismantled and is far more efficient than those in present day use. As a load rests upon the hub, the spokes below the hub will be shortened while those above the hub will be lengthened. As the arms 6 and 8 are angular with respect to the vertical, resistance will be offered to the extension or retraction, as before such action can occur, the angles of the arms must first be changed. When elongated or retracted the arms of the spokes have the tendency to resume the normal position.

When a spoke has become bent or otherwise unserviceable the disk section 14 which covers that particular spoke, may be removed without disturbing the remainder of the disks. After detaching the strap 11 any of the spokes may be removed from the wheel.

I claim:—

1. A device of the class described comprising a flanged hub, a plurality of spaced apart grooves on the periphery thereof, extensible spokes cradled in the grooves and extending radially outward, a tire encircling the outer ends of said spokes, and means for securing the spokes to said hub.

2. A device of the class described comprising a flanged hub having a plurality of grooves on its periphery, spokes cradled in said grooves extending radially and tangentially outward, said spokes being extensible and retractable, a grooved tire encircling said hub and receiving the outer ends of the spokes in its grooves, disk sections secured to the faces of the wheel and adapted to protect the spokes from injury, and means for returning the spokes to normal length after being extended.

3. A device of the class described comprising a plurality of spokes, said spokes being composed of two interlocking members, one member having angular converging arms, the other member having angular diverging arms, loops on the ends of the arms of each member being adapted to engage the arms of the opposite member, a hub having grooves thereon, the latter being adapted to receive one end of each of said spokes, a strip encircling said hub retaining said spokes in place, a grooved tire receiving the opposite ends of the spokes, and disk sections adapted to partly cover the spokes.

Signed at New York, in the county of New York, and State of New York, this 29 day of November A. D. 1922.

JOSEPH BERGER.